United States Patent
Höfig et al.

(10) Patent No.: US 10,198,303 B2
(45) Date of Patent: Feb. 5, 2019

(54) MAINTENANCE SYSTEM AND METHOD FOR ANALYZING FUNCTIONAL FAILURES OF A SYSTEM

(71) Applicant: Siemens Aktiengesellschaft, München (DE)

(72) Inventors: Kai Höfig, München (DE); Andreas Joanni, München (DE); Francesco Montrone, Riemerling (DE)

(73) Assignee: SIEMENS AKTIENGESELLSCHAFT (DE)

( * ) Notice: Subject to any disclaimer, the term of this patent is extended or adjusted under 35 U.S.C. 154(b) by 172 days.

(21) Appl. No.: 15/249,729

(22) Filed: Aug. 29, 2016

(65) Prior Publication Data

US 2017/0109223 A1  Apr. 20, 2017

(30) Foreign Application Priority Data

Oct. 15, 2015 (EP) ..................... 15189991

(51) Int. Cl.
G06F 11/07 (2006.01)
G05B 23/02 (2006.01)
G06N 7/00 (2006.01)

(52) U.S. Cl.
CPC ........ *G06F 11/079* (2013.01); *G05B 23/0283* (2013.01); *G06F 11/0721* (2013.01); *G06N 7/005* (2013.01)

(58) Field of Classification Search
CPC .......................... G06F 11/079; G06F 11/0721
USPC ....................................................... 714/47.3
See application file for complete search history.

(56) References Cited

U.S. PATENT DOCUMENTS

| | | | | |
|---|---|---|---|---|
| 4,985,857 A | * | 1/1991 | Bajpai | G05B 19/4065 702/184 |
| 6,065,133 A | * | 5/2000 | Draber | G05B 17/02 706/45 |
| 6,748,304 B2 | * | 6/2004 | Felke | G05B 23/0278 701/31.6 |
| 6,751,536 B1 | * | 6/2004 | Kipersztok | B64F 5/60 244/1 R |
| 7,006,947 B2 | * | 2/2006 | Tryon, III | G06F 11/008 702/183 |
| 7,925,397 B2 | * | 4/2011 | Underdal | G06N 5/022 701/33.4 |

(Continued)

FOREIGN PATENT DOCUMENTS

EP     1868142 A1     12/2007

OTHER PUBLICATIONS

European Extended Search Report for Application No. 15189991.1, dated Jun. 3, 2016.

*Primary Examiner* — Kamini B Patel
(74) *Attorney, Agent, or Firm* — Schmeiser, Olsen & Watts LLP

(57) ABSTRACT

A method for analyzing functional failures of a technical system using a processor to compute a meta data model, including the following steps is provided. A first step of gathering at least one failure mode for each component of a system dataset describing the technical system. A second step of associating at least one effect and at least one related maintenance task with each failure mode to mitigate and/or to dissolve the effect in the meta data model. A third step of computing failure probabilities of said technical system based on the meta data model, while the technical system is in the specific situation.

17 Claims, 5 Drawing Sheets

(56) References Cited

U.S. PATENT DOCUMENTS

| | | | | |
|---|---|---|---|---|
| 8,027,820 | B2* | 9/2011 | Tryon, III | G06F 17/5018 |
| | | | | 703/7 |
| 8,140,914 | B2* | 3/2012 | Murphy | G06F 11/1461 |
| | | | | 714/47.1 |
| 8,423,226 | B2* | 4/2013 | Underdal | G06N 7/005 |
| | | | | 701/31.4 |
| 8,738,549 | B2* | 5/2014 | Lingenfelder | G06F 17/18 |
| | | | | 706/12 |
| 9,111,264 | B2* | 8/2015 | Coard | G06Q 10/06316 |
| 9,681,317 | B2* | 6/2017 | Carlin | H04W 24/04 |
| 9,805,522 | B2* | 10/2017 | Schnurr | B60W 50/0097 |
| 2004/0193958 | A1* | 9/2004 | Shah | G05B 23/0278 |
| | | | | 714/37 |
| 2005/0038678 | A1* | 2/2005 | Qian | A61B 5/00 |
| | | | | 705/2 |
| 2006/0150018 | A1* | 7/2006 | Cousin | G05B 23/0248 |
| | | | | 714/26 |
| 2007/0294000 | A1* | 12/2007 | Underdal | G06N 5/003 |
| | | | | 701/31.8 |
| 2010/0229044 | A1* | 9/2010 | Fountain | G05B 23/0251 |
| | | | | 714/37 |
| 2011/0161104 | A1* | 6/2011 | Gilbert | G06N 5/003 |
| | | | | 705/2 |
| 2013/0185093 | A1* | 7/2013 | Wittliff, III | G06F 19/345 |
| | | | | 705/2 |
| 2015/0105968 | A1* | 4/2015 | Ho | G07C 5/006 |
| | | | | 701/31.5 |
| 2017/0299640 | A1* | 10/2017 | Arya | G01R 22/068 |

* cited by examiner

FIG 1

| | FIG 1A | FIG 1B |
|---|---|---|

FIG 1A

| C1 | C2 | C3 | C4 | C5 | C6 | C7 | C8 | C9 |
|---|---|---|---|---|---|---|---|---|
| Nr. | Type | Part | Circuit ID | Function | α | Failure Mode | Effect | % |
| 1 | Capacitor | 10nF/120V | C101 | smooth output | 10.00 | short circuit | amplification factor execeeds | 50% |
| | | | | | 10.00 | open circuit | limitations | 50% |
| | | | | | 10.00 | Copy this line | no effect | 0% |
| | | | | | 0.00 | Do not copy this line | | 100% |
| 2 | Resistor | 10kOhm | R305 | regulates amplification factor | 20.00 | short circuit | no effect | 50% |
| | | | | | 20.00 | open circuit | amplification factor execeeds | 50% |
| | | | | | 20.00 | Copy this line | limitations | 0% |
| | | | | | 00.00 | Do not copy this line | | 100% |

FIG 1B

| | safe | dang | * | $\lambda_s$ | $\lambda_d$ | $\lambda^*$ | Diagnosis | DCcomp | $\lambda_{du}$ | $\lambda_{dd}$ |
|---|---|---|---|---|---|---|---|---|---|---|
| | 0 | 1 | 0 | 0,000 | 5,000 | 0,000 | Pulsed test will detect this failure | 90,0 | 0,50 | 4,50 |
| | 0 | 0 | 1 | 0,000 | 0,000 | 5,000 | | 0,0 | 0,00 | 0,00 |
| | 0 | 1 | 0 | 0,000 | 0,000 | 0,000 | | 0,0 | 0,00 | 0,00 |
| | 0 | 0 | 1 | 0,000 | 0,000 | 10,000 | | 0,0 | 0,00 | 0,00 |
| | 0 | 1 | 0 | 0,000 | 10,000 | 0,000 | Pulsed test will detect this failure | 90,0 | 1,00 | 9,00 |
| | 0 | 1 | 0 | 0,000 | 0,000 | 0,000 | | 0,0 | 0,00 | 0,00 |

C10 C11 C12 C13 C14 C15 C16 C17 C18 C19

MAINTENANCE SYSTEM AND METHOD FOR ANALYZING FUNCTIONAL FAILURES OF A SYSTEM

CROSS-REFERENCE TO RELATED APPLICATIONS

This application claims priority European application No. EP 15189991.1 having a filing date of Oct. 15, 2015, the entire contents of which are hereby incorporated by reference.

FIELD OF TECHNOLOGY

The following relates to a method for analyzing functional failures of a technical system. In particular it relates to a method for analyzing functional failures of a technical system when a processor computes a meta data model.

BACKGROUND

The international standard IEC (International Electrotechnical Commission) 60300 defines reliability centered maintenance as a standardized methodology to improve maintenance effectiveness and to provide mechanisms for managing maintenance with a high degree of control and awareness. A functional failure analysis of a system is used to select maintenance tasks and to implement a reliability centered maintenance program. The Failure Mode and Effects Analysis (FMEA) examines the consequences of potential failures on the functionality of a system. Different variations of FMEAs are currently used in most domains to analyze critical systems. Since modern critical systems tend to increased complexity, automations and tool support have a long history in research and industry. Whereas compact embedded systems can be analyzed using FMEA in a manually maintained table, complex systems easily result in an unmanageable long table especially when larger development teams are involved.

SUMMARY

An aspect relates to providing a method and a maintenance system for analyzing the possible functional failures of a complex system.

A system in context of this application is a technical system, for example a wind power station with several windmills or a manufacturing plant (e.g., automotive engineering). A subsystem can be a windmill of a wind power station or a production robot of a manufacturing plant.

Unless specifically stated otherwise, as apparent from the following discussions, it is appreciated that throughout the specification discussions utilizing terms such as "processing", "computing", "calculating", "determining", "generating", "configuring" or the like, refer to the action and/or processes of a computer that manipulates and/or transforms data into other data, said data represented as physical, e.g. such as electronic, quantities. The term "computer" should be expansively construed to cover any kind of electronic device with data processing capabilities, including, by way of non-limiting example, personal computers, servers, handheld computer systems, Pocket PC devices, Cellular communication device and other communication devices with computing capabilities, processors and microcontrollers (e.g. digital signal processor (DSP) possibly in combination with memory and storage units, application specific integrated circuit "ASIC", etc.) and other electronic computing devices.

The operations in accordance with the teachings herein may be performed by a computer specially constructed for the desired purposes or by a general purpose computer specially configured for the desired purpose or for the desired operations by a computer program stored in a computer readable storage medium.

A first aspect of the present disclosure provides a method for analyzing functional failures of a technical system using a processor to compute a meta data model comprising the following steps.

A first step of gathering at least one failure mode for each component of a system dataset describing said technical system. A second step of associating
- at least one effect and at least one related maintenance task with each failure mode to mitigate and/or to dissolve said effect;
- at least one situation dataset with said system dataset reflecting conditions of a specific situation while said technical system is operating;
- a design reliability dataset indicating a first probability with each failure mode defined during a design time of the technical system;
- a situation reliability dataset indicating a second probability with a failure mode defined by the at least one situation dataset;

in the meta data model. A third step of computing failure probabilities of said technical system based on said meta data model, while the technical system is in the specific situation.

The method is able to conduct a FMEA which takes into account situation-based variations in failure probabilities. It is possible to incorporate failure probabilities which change non-uniformly over all existing installations while the technical system is operating. An example is a valve that is working with a low failure probability in European weather conditions but has a high failure rate in a desert. Analyzing different situations by this method leads to consistent FMEA even when the number of analysis lines or the number of situations increase and become impossible to be maintained by a manual table.

Furthermore, the method is able to conduct a FMEA which takes into account situation-based variations in task intervals. Changing failure probabilities depending on different situations can lead to different maintenance intervals. As described above, a valve can have a high failure probability in the situation of harsh weather conditions. Consequently, the maintenance task interval needs to be adapted to this situation. With this method the right task for the correct situation can be easily selected.

In an embodiment of the method according to the first aspect, said system dataset comprises at least one subsystem and each component is a part of the at least one subsystem.

The method is able to conduct an analysis of complex technical systems which can consist of a plurality of subsystems and components.

In another embodiment of the method according to the first aspect, the at least one situation dataset defines at least one situation task to mitigate and/or to dissolve a failure mode caused by the specific situation.

To improve the precision of the computed failure probabilities the situation dataset contains situation tasks which mitigate or dissolve a failure mode caused by the specific situation.

In another embodiment of the method according to the first aspect, the at least one effect is associated with at least one design task to mitigate said effect.

To improve the precision of the computed failure probabilities the effects are associated with a design task.

In another embodiment of the method according to the first aspect, the at least one maintenance task comprises of the at least one design task and/or the at least one situation task.

To improve the precision and the computation performance of the computed failure probabilities the maintenance task comprises of the at least one design task and/or the at least one situation task.

In another embodiment of the method according to the first aspect, said technical system comprises at least one sensor to acquire the at least one situation dataset. Additionally, the at least one situation dataset preferably is transmitted to a centralized maintenance station. Additionally, the centralized maintenance station preferably computes the failure probabilities of said technical system. Additionally, the centralized maintenance station preferably computes the failure probabilities of at least one other technical system.

If the maintenance systems recognizes new dominant failure mode, e.g. by using the sensor, this dominant failure mode is added to the corresponding component in a component database. Scheduled checks will find a new failure mode for component instances for the system instance describing the technical system. New reliability centered maintenance tasks can then be scheduled for the new failure modes. Furthermore, situations can be modeled using the reliability data measured by sensors or more sophisticated reliability measurements.

In another embodiment of the method according to the first aspect, the situation dataset includes weather conditions, vibration, noise, radiation, and a combination thereof.

In another embodiment of the method according to the first aspect, the method is a failure mode and effects analysis.

In another embodiment of the method according to the first aspect, the analysis is conducted for at least one other technical system. Additionally, for each analysis a separate meta data model preferably is computed.

To increase the efficiency of the method it can be applied to several technical systems in parallel. Preferably, the analysis is conducted by a centralized maintenance system, which is able to observe and maintain a plurality of technical systems.

In another embodiment of the method according to the first aspect, if a situation reliability dataset is available for a failure mode the situation reliability replaces a design reliability dataset for that failure mode. Additionally, if situation reliability dataset is unavailable for a failure mode preferably the design reliability dataset is used for that failure mode to compute the failure probabilities of said technical system.

Using the situation dataset, a reliability centered maintenance approach can be better maintained where only some of the probability values were replaced by more precise or situation related values. If the technical system is analyzed for example for the specific situation desert, the situation reliability dataset replaces the design reliability dataset. If there is no situation reliability dataset replacing a design reliability dataset, the design reliability dataset is used instead.

In another embodiment of the method according to the first aspect, if a situation task is available to mitigate and/or to dissolve a failure mode the situation task replaces the design task for that failure mode. Additionally, if a situation task is unavailable to mitigate and/or to dissolve a failure mode preferably the design task is used to mitigate and/or to dissolve that failure mode and/or an effect associated with that failure mode.

Using the situation task, a reliability centered maintenance approach can be better maintained where only some of the maintenance tasks were replaced by more precise or situation related values. If the technical system is analyzed for example for the specific situation desert, the situation task replaces the design task. If there is no situation task replacing a design task, the design task is used instead.

A second aspect of the present disclosure provides a maintenance system for analyzing functional failures of a technical system. The maintenance system comprises a processor to compute a meta data model. Additionally, the maintenance system comprises a database unit to store the meta data model. Additionally, the maintenance system comprises a gathering unit to gather at least one failure mode for each component of a system dataset describing said technical system. Additionally, the maintenance system comprises an association unit to associate in the meta data model at least one effect and at least one related maintenance task for each failure mode to mitigate and/or to dissolve said effect;

at least one situation dataset with said system dataset reflecting conditions of a specific situation while said system is operating;

a design reliability dataset indicating a first probability with each failure mode defined during a design time of the technical system; and a situation reliability dataset indicating a second probability with a failure mode defined by the specific situation.

Additionally, the maintenance system comprises a computation unit to compute, by means of the processor, failure probabilities of said technical system based on said meta data model while said technical system is in the specific situation.

In another embodiment of the maintenance system according to the second aspect, said system comprises at least one subsystem and each component is a part of the at least one subsystem. Additionally, the at least one situation dataset preferably defines at least one situation task to mitigate and/or to dissolve a failure mode caused by the specific situation. Additionally, the at least one effect preferably is associated with at least one design task to mitigate said effect.

In another embodiment of the maintenance system according to the second aspect, the maintenance system is connected by means of a network with said technical system. Additionally, the maintenance system preferably is connected by means of the network with at least one other technical system to analyze the functional failures of the at least one other technical system.

In another embodiment of the maintenance system according to the second aspect, the functional failures are analyzed for at least one another technical system. Additionally, for the at least one other technical system a separate meta data model preferably is computed.

A further aspect of the present disclosure provides a computer program product storing executable instructions adapted to perform the method disclosed by the present disclosure. Furthermore, a providing apparatus is claimed for saving and/or providing a program data and/or instruction block of said executable instructions. The providing apparatus can be a data storage saving and/or providing the computer program product. Alternatively, the providing apparatus can be a computer system and/or a server system and/or a network and/or a cloudbased computer system and/or virtual computer system. The providing apparatus saves and/or provides the computer program product. Preferably, the complete computer program product is provided by said providing apparatus in the form of a download, for example as a file or a data stream. Alternatively, the computer program product is provided by at least two partial downloads, for example provided by a peer to peer network, each containing a piece of said computer program product. For example such a computer program product can be provided by a data storage, which is read and executed by a computer system. As a consequence the computer system is able to execute the disclosed method.

A data storage or computer-readable medium can be electronic, magnetic, optical, or a semiconductor system (or apparatus or device). Examples of a computer-readable medium include, but are not limited to, a semiconductor or solid state memory, magnetic tape, a removable computer diskette, a random access memory (RAM), a read-only memory (ROM), a rigid magnetic disk, an optical disk, etc. Current examples of optical disks include compact disk-read only memory (CD-ROM), compact disk-read/write (CD-R/W) and digital versatile disk (DVD).

Further modifications and variations will emerge from the features of the dependent claims.

BRIEF DESCRIPTION

Some of the embodiments will be described in detail, with reference to the following figures, wherein like designations denote like members, wherein:

FIG. 1 FIGS. 1A and 1B illustrate a manually maintained FMEA (or FMEDA) table;

Figure 2:
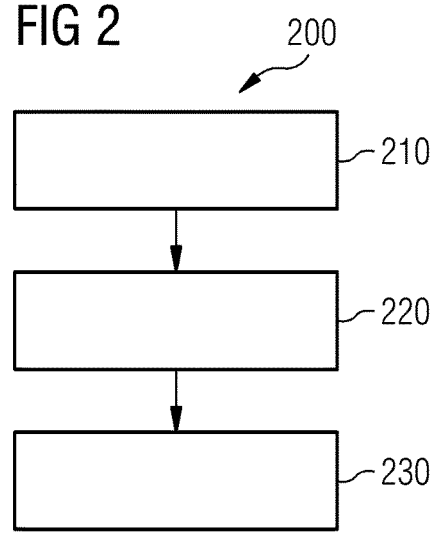
FIG. 2 shows a chart for illustrating an exemplary embodiment of a method for analyzing functional failures of a system according to an aspect of the present disclosure.

The accompanying drawings are intended to provide a better understanding of the embodiments. They show embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

DETAILED DESCRIPTION

FIG. 1 shows a simple manually maintained FMEA table for a compact embedded system.

Failure mode and effects analysis (FMEA) is an inductive reasoning (e.g., forward logic) single point of failure analysis for safety critical systems. Failure mode and effects analysis are available in different variations for different applications, such as software or processes. Failure mode and effects analysis may be either qualitative or quantitative. The variations analyze failure modes of elements and the effects of the failure modes on the analyzed system. A generic quantified FMEA is described for a domain independent application of electrical/electronic/programmable electronic systems in the International Standard IEC 61508. Without the quantifications, the FMEA described therein is also generic for the qualitative variation of the analysis. The variation of FMEA described therein is referred to as a Failure Mode Effects and Diagnostic Analysis, or Failure Mode Effects and Diagnostic Coverage Analysis (FMEDA).

A FMEA (or FMEDA) as described in the above-referenced publication is typically developed using a manually maintained table with the support of a spreadsheet processing computer system. FIGS. 1A and 1B collectively show an example of a table from such a system. In column C1 of the table, the analyzed parts are numerated. Parts may be components or electronic devices. In column C2, the type of the analyzed part is indicated, e.g., a capacitor or resistor. In column C3, the electronic type of the part is indicated, e.g., the capacitor is a 10 nF/120V capacitor. In column C4, the identifier is used to identify the part in the specific system is indicated, such as an identification number of the electric circuit plan, e.g., CIOI for the capacitor.

In column C5, the function of the part is textually described. In column C6, the failure rate lambda is indicated, e.g., 10FIT (failure in time, $1*10^{-9}$ per hour) for the capacitor. Column C7 presents the failure modes of the part, such as two metal connectors of the capacitor may either short circuit or be damaged and in an open circuit state. Column C8 is used to describe a failure effect that corresponds with a failure mode. For example, if the capacitor is in an open circuit state, the failure has no consequences. Column C9 is used to allocate (e.g., split) the failure rate lambda (as indicated in column C6) to the individual failure modes. For example, the failure rate of 10FIT of the capacitor is equally split for the two failure modes of the capacitor. Columns C10 to C12 are used to categorize the failure effect into the categories "safe", "dangerous", and "disregard" (or "don't care"). Columns C13 to C15 calculate the residual failure rate for the specific failure effect and category (safe $\lambda_s$, dangerous $\lambda_d$, and disregard $\lambda^*$). For example, the failure rate $\lambda_d$ for the failure mode "short circuit" is 5FIT since $$10\text{FIT(column } C6)*50\% \text{ (column } C9)*1\text{(column } C11)=5\text{FIT}$$

The other columns are calculated accordingly. Column C16 is used to describe a possible diagnostic measure capable of detecting or mitigating a dangerous failure effect. For example, the failure effect corresponding to the failure mode "short circuit" of the capacitor is detected by a pulsed test signal. Column C17 indicates the effectiveness of that measure. For example, the pulsed signals that detect the dangerous failure effect of the open circuit failure mode of the capacitor may only detect or mitigate a fraction of 90% of the occurrences of that failure effect. Column C18 is used to calculate the residual failure rate that a dangerous failure effect goes undetected ($\lambda_d$ undetected, or $\lambda_{du}$). Column C19 is used to calculate the failure rate for the case that the dangerous failure effect is detected by the diagnostic measure ($\lambda_d$ detected, or $\lambda_{dd}$).

The manually maintained table of FIG. 1 may contain automation, such as when implemented in a spreadsheet application. The automation may calculate the values for the different failure rates or completeness of the percentages.

Because modern safety critical systems tend to increase complexity, automations and tool support have a long history in research and industry. Whereas compact embedded systems may be analyzed using FMEA in a manually maintained table, more complex systems may result in an unmanageably long table, such as when larger development teams are involved.

FIG. 2 shows a chart for illustrating a first possible exemplary embodiment of a method 200 for analyzing the functional failures of a system according to an aspect of the present disclosure.

The method 200 for analyzing functional failures of a technical system uses a processor to compute and process a meta data model. The computed meta model is then used to calculate failure probabilities of said technical system while the technical system is in a specific situation.

In detail, in a first step 210 at least one failure mode for each component of a system dataset describing said system is gathered.

In a second step 220 several associations between datasets are created in the meta data model. First, at least one effect and at least one related maintenance task with each failure mode to mitigate and/or to dissolve said effect are associated. Second, at least one situation dataset is associated with said system dataset. The at least one situation dataset reflects conditions of a specific situation (e.g., new weather conditions, vibration, noise, radiation or anything else that effects failure probabilities from the outside of the technical system or the environment) while said technical system is operating. Third, a design reliability dataset indicating a first probability is associated with each failure mode. This first probability is defined during a design time of the technical system and corresponds to an expected probability (e.g., based on existing technical systems or experience) for a preferably specific failure mode. Forth, a situation reliability dataset indicating a second probability is associated with a failure mode defined by the at least one situation dataset. The second probability indicates a probability induced by run-time conditions of said technical system, which are preferably measured by at least one sensor.

In a third step 230, failure probabilities of said technical system based on said meta data model are computed, while the technical system is in a specific situation (e. g. operates currently under a high level of ionized radiation). Additionally, this failure properties preferably are computed for specific situations happened in the past. This is preferably done, when the reliability of a technical system is analyzed for example during a scheduled system maintenance.

Figure 3:
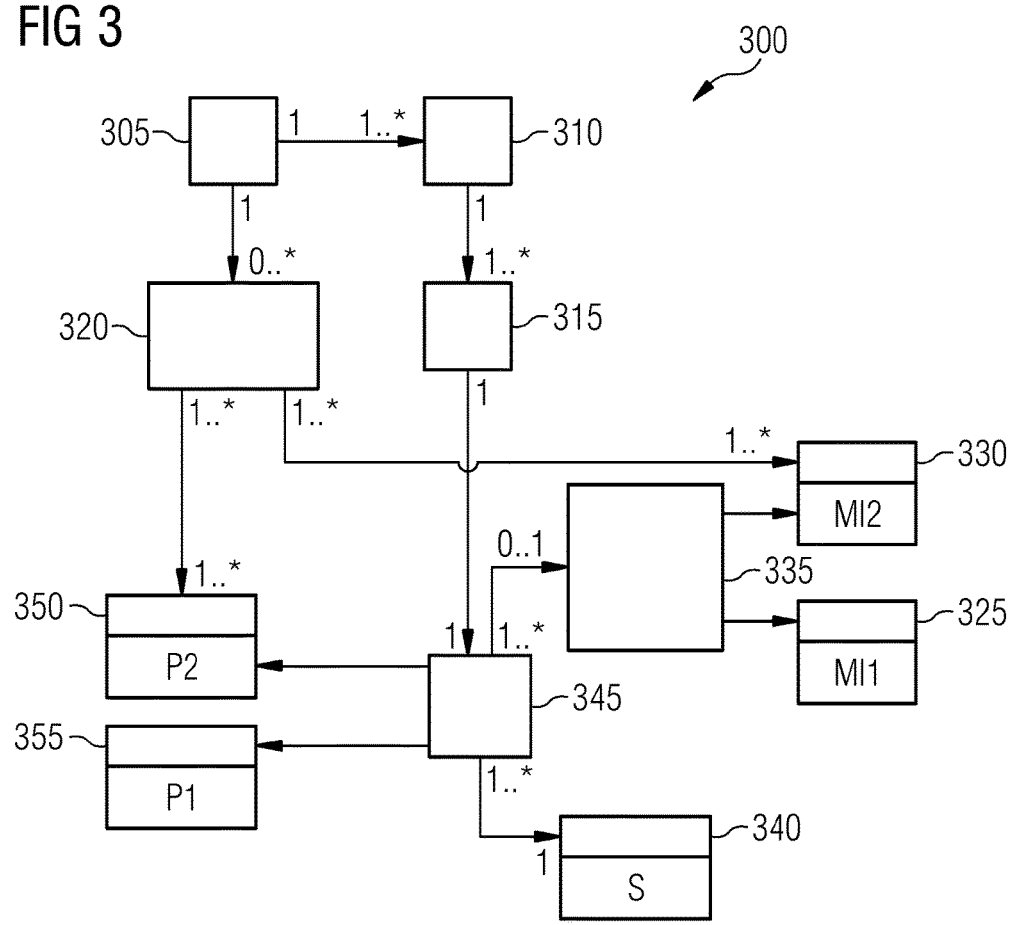
FIG. 3 shows a diagram of a generalized meta data model according to an aspect of the present disclosure.

FIG. 3 shows a diagram of a generalized meta data model 300 according to an aspect of the present disclosure. For example, this generalized meta data model 300 can be used by the embodiment according to the description of FIG. 2.

FIG. 3 shows the meta data model 300 for a FMEA analysis using a situation dataset 320 for a situation to overcome classical problems of a conventional FMEA.

Problems can be caused by situation-based variations in failure probabilities in a conventional FMEA. Since reliability centered maintenance starts at design time, only assumptions can be made about failure probabilities. During the operation phase, such previously assumed probabilities can change. But they do not change uniformly over all existing installations of a technical system. Depending on the situation where installations (e.g., the technical system or components of a technical system) are built, the failure probabilities can change dramatically. An example is a valve that is working with a low failure probability in European weather conditions but has a high failure rate in the desert. Analyzing different situations in a manually maintained table (conventional FMEA) lead to inconsistencies when the number of analysis lines or the number of situations increase and become hard to maintain.

Further problems can be caused by situation-based variations in task intervals in a conventional FMEA. Changing failure probabilities depending on different situations can lead to different maintenance intervals. As described above, a valve can have a high failure probability in the situation of harsh weather conditions. Consequently, the maintenance task interval needs to be adapted to this situation. Selecting the right task for the correct situation is a complex task in a manually maintained table (conventional FMEA) and error prone when the number of analysis lines or the number of situations increase and become hard to maintain.

In detail, FIG. 3 describes the elements of a situation-based reliability centered maintenance FMEA (RCM FMEA) and their relations as the meta data model 300. A system dataset 305 describing the technical system can have at least one subsystem 310 which can consist of several components. In detail, the system dataset comprises for example information about the type of the technical system (e.g., wind power plant or a water power plant), the year of construction or an identifier for the technical system. A component 315 has some failure modes 345. Failure modes 345 have an effect 340 with a severity S and a related preventive maintenance task 335 which mitigates the effect 340. Since the reliability centered maintenance is a methodology that starts to be applied during the design phase (or design time) of a product or system dataset 305, each failure mode has a failure probability P1 (or a first probability) assumed at design time, here modeled using the element design reliability dataset 355. Each effect 340 can be mitigated by attaching a design task 325 at design time to the preventive maintenance task 335 element. Additionally, the design task 325 comprises a first task maintenance interval MI1.

During the operating phase of the system dataset 305, when new situations require an adoption of failure probabilities and maintenance task intervals, a situation dataset element 320 can be used to add new task intervals and failure probabilities P2 (second probability) to an existing analysis. A situation can reflect new weather conditions, vibration, noise, radiation or anything else that effects failure probabilities from the outside of the technical system or the environment.

The situation dataset 320 can add a new situation reliability dataset 350 to all existing failure modes and can also assign new at least one situation task 330 with a second task maintenance interval MI2 for all existing preventive maintenance tasks 335. In detail, the new situation reliability dataset 350 comprises for example the second probability P2. Using the situation dataset 320 element, an analysis can be made that allows analyzing the failure probabilities of the entire technical system that is in a specific situation. Preferably, if no new failure probabilities or changed preventive maintenance task intervals are set for a specific situation, the values that were assigned as assumptions at design time are taken as default values.

In other words, a situation information (for example the situation dataset 320 element), which is for example associated with the situation reliability dataset 350 and the at least one situation task 330, preferably replaces a design reliability information (for example the design reliability dataset 355) and a design task information (for example the design task 325) in the meta data model 300. As disclosed above, a component information (for example the component 315) is associated with a failure mode information (for example the failure mode 345), wherein the failure mode information describes for example the failure modes of an oil filter.

In detail, the design reliability dataset 355 associated with the failure mode 345 is replaced by the situation reliability dataset 350. In an analogous manner, the design task 325 is replaced by the at least one situation task 330.

In some cases the design reliability datasets (for example the design reliability dataset 355) and design tasks (the design tasks 325) of a meta data model are replaced partially by the situation information (for example the situation dataset 320 element), because not for each component and its associated failure modes the situation information can be acquired. In cases where for some components of a meta data model a situation information for a specific situation is unavailable, the design reliability information (for example the design reliability dataset 355) and the design task information (design task 325) is used to compute the failure probabilities while the technical system is in the specific situation.

Preferably, the technical system analyzed by the meta data model comprises sufficient sensors (e.g., temperature sensors, flow meters, pressure sensors etc.) to acquire for each component (for example the component 315) of the system dataset 305 a situation dataset (for example the situation dataset 320) for the specific situation.

The next section shows how the elements and relations as described are used within an example system.

Figure 4:
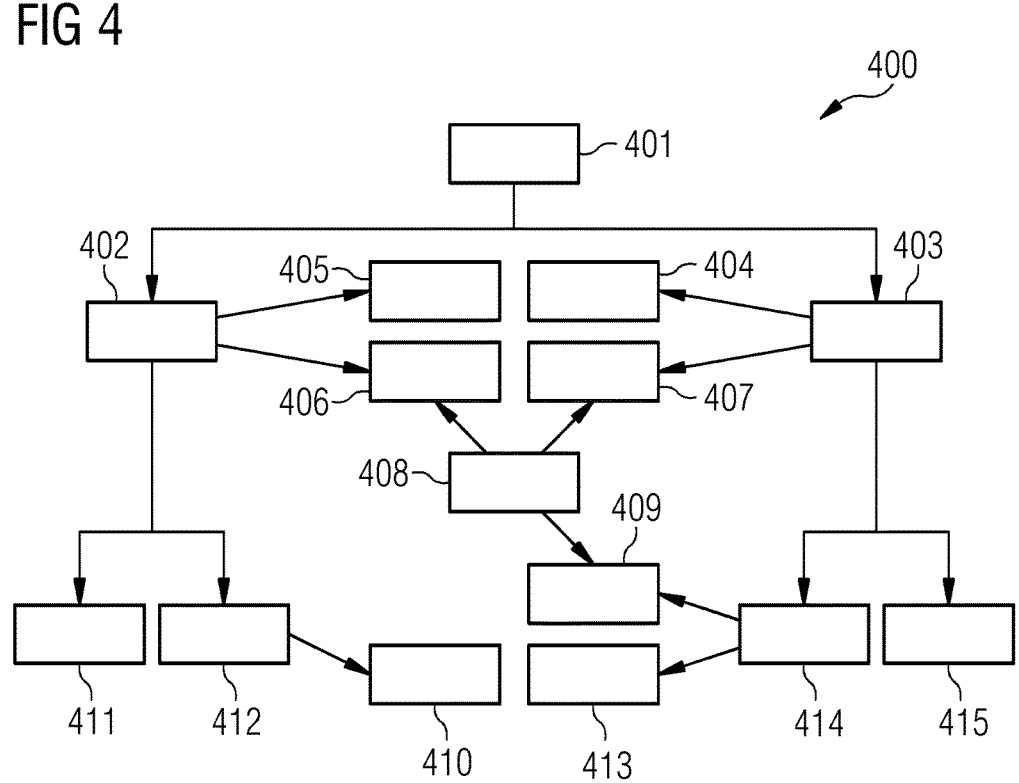
FIG. 4 shows a diagram of a specific meta data model used by the first embodiment according to an aspect of the present disclosure.

FIG. 4 shows a diagram of a specific meta data model 400 used by the first embodiment according to an aspect of the present disclosure. In detail, this section shows the elements of the meta data model 400 within an example system.

FIG. 4 shows how the meta data model 400 for a reliability centered maintenance FMEA as described in FIGS. 2 and 3. The reliability centered maintenance FMEA and its meta data model 400 can be used to analyze a technical system in a specific situation.

Here, the analyzed technical system consists of one single central cooling water valve component. This component has two associated failure modes, cooling water valve failed open 403 and cooling water valve failed closed 402. The failure mode cooling water valve failed closed 402 has an associated effect, plant overheats 411 and the failure mode cooling water valve failed open 403 has the associated effect plant ineffective 415.

During the development of the technical system, the failure mode cooling water valve failed open 403 has a first associated design reliability dataset 404 element holding the assumed failure probability (first probability) of the failure mode. The other failure mode cooling water valve failed closed 402 has a second associated design reliability dataset 405 element holding the assumed failure probability (first probability) of the failure mode. The failure mode cooling water valve failed closed 402 has an associated first preventive maintenance task 412.

During the design phase there is the associated design task of checking the valve every day 410. The failure mode cooling water valve failed open 403 has also a second associated preventive maintenance task 414. At design time, it was decided, that it is not necessary to prevent this failure mode (modeled using the design task of no preventive maintenance 413).

During the operation phase of the technical system, the analysis is extended by processing the situation desert (e.g., a climate/temperature change provided by sensor) and creating a situation dataset 408 for this specific situation. In this situation, the failure mode cooling water valve failed open 403 and cooling water valve failed closed 402 have changed situation reliability data and the former design task of no preventive maintenance 413 is changed using the situation task of replacing the valve every year 409. In detail, the failure mode cooling water valve failed closed 402 is associated with a first situation reliability dataset 406 and the failure mode cooling water valve failed open 403 is associated with a second situation reliability dataset 407.

Using the situation dataset 408 element, a reliability centered maintenance approach can be maintained where only some of the probability values and maintenance tasks were replaced by more precise or situation related values. If the technical system is analyzed for the specific situation desert, the situation reliability dataset elements replace the design reliability dataset elements. The same is true for the design tasks. If there is no situation task replacing a design task, the design task is used instead. In the example technical system, the design task of checking the valve every day 410 is taken for the situation desert as a default value, since the situation desert does not provide a more sophisticated situation task for this preventive maintenance task.

Figure 5:
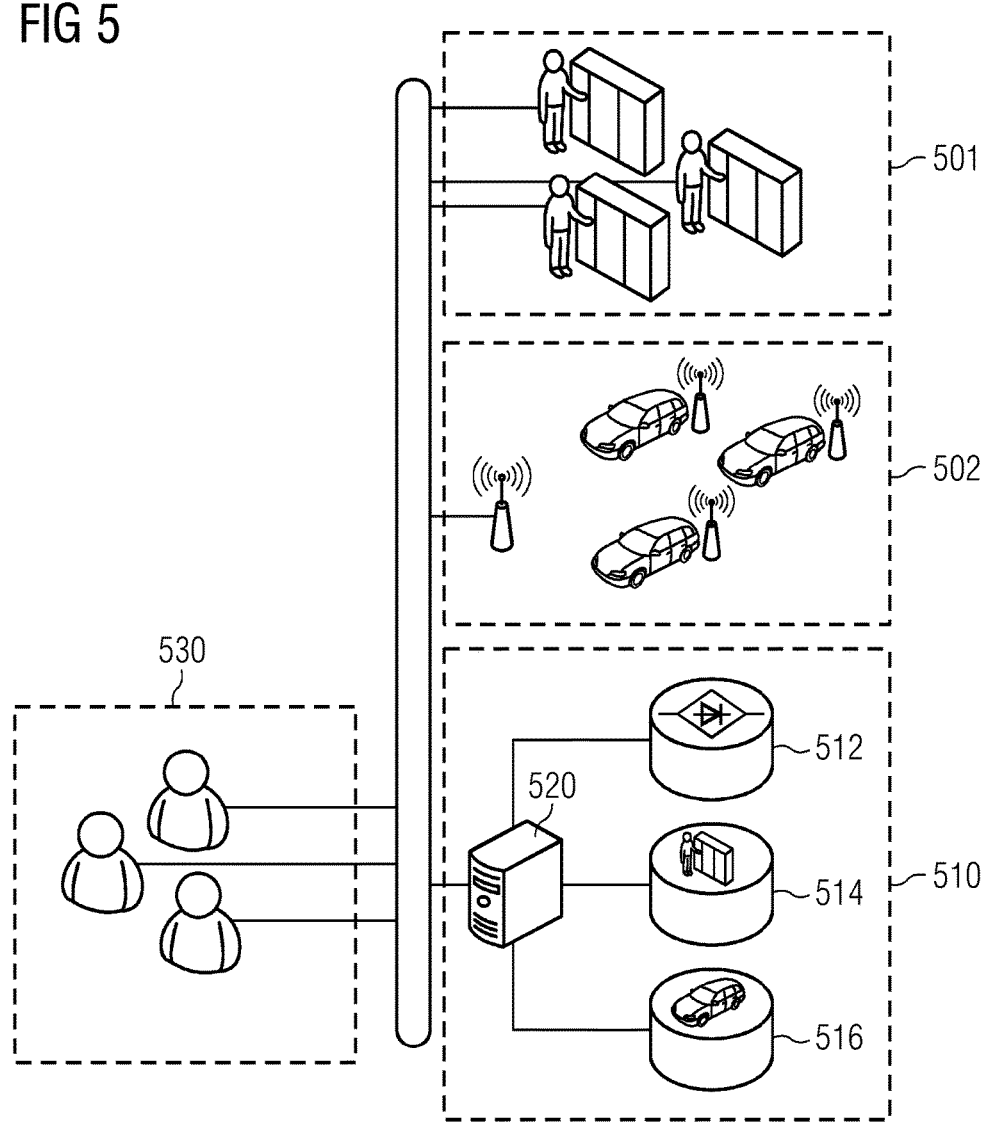
FIG. 5 shows a diagram for illustrating a maintenance system according to an aspect of the present disclosure.

FIG. 5 shows a diagram for illustrating a maintenance system 510 according to an aspect of the present disclosure.

In detail, FIG. 5 shows an exemplary implementation of the meta data model of the maintenance system 510 as described in FIGS. 2 and 3. In this example a first technical system 501 and a second technical system 502 exist.

The maintenance system comprises a processor to compute a meta data model. Additionally, the maintenance system comprises a database unit 520 to store the meta data model. Additionally, the maintenance system comprises a gathering unit to gather at least one failure mode for each component of said first technical system 501. For example the gathering unit uses service interfaces to get this dataset from the components. Additionally, the maintenance system comprises a an association unit to associate in the meta data model at least one effect and at least one related maintenance task with each failure mode to mitigate and/or to dissolve said effect;

at least one situation dataset with said first technical system 501 reflecting conditions of a specific situation while said first technical system 501 is operating;

a design reliability dataset indicating a first probability with each failure mode defined during a design time of the first technical system 501; and a situation reliability dataset indicating a second probability with a failure mode defined by the specific situation.

Additionally, the maintenance system comprises a computation unit to compute by means of the processor failure probabilities of said first technical system 501 based on said meta data model while said first technical system 501 is in the specific situation.

Furthermore, the meta data model is used to structure the data in the database unit 520, for example one database for component data 512, holding components and failure mode dataset, a second database 514 holding reliability centered maintenance data for the first technical system 501 and third database 516 holding the data for the second technical system 502.

The stakeholders 503 of analysis design and engineering are connected via terminal applications to the maintenance system 510. If an engineer recognizes a new dominant failure mode in field or a system itself recognizes it, e.g. by using sensors, this dominant failure mode is added to the corresponding component in the component database. Scheduled checks will find a new failure mode for component instances for the first technical system 501 and the second system 502. New reliability centered maintenance tasks can then be scheduled for the new failure modes. Furthermore, situations can be modeled using the reliability data measured by sensors or more sophisticated reliability measurements.

I/O devices (including but not limited to keyboards, displays, pointing devices, etc.) can be connected to the maintenance system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

The described embodiments and developments can be combined in any manner with one another as far as this is expedient. Further possible embodiments, developments and implementations of the invention also comprise not specifically cited combinations of features of the invention described above or in the following in relation to the exemplary embodiments.

The invention claimed is:

1. A method for analyzing functional failures of a technical system, wherein a processor computes a meta data model by executing the following steps:
    gathering at least one failure mode for each component of a system dataset describing said technical system;
    associating at least one effect and at least one related maintenance task with each failure mode to mitigate and/or to dissolve said effect;
    at least one situation dataset with said system dataset reflecting conditions of a specific situation while said technical system is operating;
    a design reliability dataset indicating a first probability with each failure mode defined during a design time of the technical system;
    a situation reliability dataset indicating a second probability with a failure mode defined by the at least one situation dataset in the meta data model; and
    computing failure probabilities of said technical system based on said meta data model, while the technical system is in the specific situation; and
    wherein said technical system comprises at least one sensor to acquire the at least one situation dataset or to create a new situation dataset and updating the meta data model with the at least one situation dataset or the new situation dataset.

2. The method according to claim 1, wherein said system dataset comprises at least one subsystem and each component is a part of the at least one subsystem.

3. The method according to claim 1, wherein the at least one situation dataset defines at least one situation task to mitigate and/or to dissolve a failure mode caused by the specific situation.

4. The method according to claim 1, wherein the at least one effect is associated with at least one design task to mitigate said effect.

5. The method according to claim 4, wherein the at least one maintenance task comprises of the at least one design task and/or the at least one situation task.

6. A method for analyzing functional failures of a technical system, wherein a processor computes a meta data model by executing the following steps:
    gathering at least one failure mode for each component of a system dataset describing said technical system;
    associating at least one effect and at least one related maintenance task with each failure mode to mitigate and/or to dissolve said effect;
    at least one situation dataset with said system dataset reflecting conditions of a specific situation while said technical system is operating;
    a design reliability dataset indicating a first probability with each failure mode defined during a design time of the technical system;
    a situation reliability dataset indicating a second probability with a failure mode defined by the at least one situation dataset in the meta data model;
    computing failure probabilities of said technical system based on said meta data model, while the technical system is in the specific situation; and
    wherein said technical system comprises at least one sensor to acquire the at least one situation dataset or to create a new situation dataset, the at least one situation dataset or the new situation dataset is preferably transmitted to a centralized maintenance station, the centralized maintenance station updates the meta data model with the at least one situation dataset or the new situation dataset, the centralized maintenance station computes the failure probabilities of said technical system, while the technical system is in the specific situation, and the centralized maintenance station preferably computes the failure probabilities of at least one other technical system, while the at least one other technical system is in a specific situation.

7. The method according to claim 1, wherein the situation dataset includes weather conditions, vibration, noise, radiation, and/or a combination thereof.

8. The method according to claim 1, wherein the method is a failure mode and effects analysis.

9. The method according to claim 6, wherein the analysis is conducted for at least one other technical system, and for each analysis a separate meta data model is computed.

10. The method according to claim 1, wherein if a situation reliability dataset is available for a failure mode it replaces a design reliability dataset for that failure mode; and a situation reliability dataset is unavailable for a failure mode preferably the design reliability dataset is used for that failure mode to compute the failure probabilities of said technical system.

11. The method according to claim 3, wherein if a situation task is available to mitigate and/or to dissolve a failure mode it replaces the design task for that failure mode; and a situation task is unavailable to mitigate and/or to dissolve a failure mode preferably the design task is used to mitigate and/or to dissolve that failure mode and/or an effect associated with that failure mode.

12. A maintenance system for analyzing the functional failures of at least one technical system, comprising:
- a processor to compute a meta data model;
- a database unit to store the meta data model;
- a gathering unit to gather at least one failure mode for each component of a system dataset describing said technical system;
- an association unit to associate in the meta data model at least one effect and at least one related maintenance task with each failure mode to mitigate and/or to dissolve said effect;
- at least one situation dataset with said system dataset reflecting conditions of a specific situation while said technical system is operating;
- a design reliability dataset indicating a first probability with each failure mode defined during a design time of the technical system;
- a situation reliability dataset indicating a second probability with a failure mode defined by the specific situation;
- a computation unit to compute by the processor failure probabilities of said technical system based on said meta data model while said technical system is in the specific situation; and
- updating the meta data model with the at least one specific situation or a new situation dataset while said technical system is in the specific situation.

13. The maintenance system according to claim 12, wherein said system dataset comprises at least one subsystem and each component is a part of the at least one subsystem, wherein the at least one situation dataset preferably defines at least one situation task to mitigate and/or to dissolve a failure mode caused by the specific situation, the at least one effect is associated with at least one design task to mitigate said effect.

14. The maintenance system according to claim 12, wherein the maintenance system is connected by means of a network with said technical system, the maintenance system is connected by means of the network with at least one other technical system to analyze the functional failures of the at least one other technical system.

15. The maintenance system according to claim 14, wherein the functional failures are analyzed for at least one another technical system, and for the analyzed at least one other technical system a separate meta data model is computed.

16. A computer program product, comprising a computer readable hardware storage device having computer readable program code stored therein, said program code executable by a processor of a computer system to implement a method according to claim 1.

17. A providing device for the computer program product according to claim 16, wherein the providing device provides and/or saves the computer program product.

* * * * *